(12) United States Patent
Torres et al.

(10) Patent No.: US 11,922,175 B2
(45) Date of Patent: Mar. 5, 2024

(54) UNPLANNED REBOOT EXPEDITED RECOVERY FOR NETWORK DEVICES

(71) Applicant: Arista Networks, Inc., Santa Clara, CA (US)

(72) Inventors: Gil Adrian Torres, San Francisco, CA (US); Zihao Wang, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 25 days.

(21) Appl. No.: 17/877,196

(22) Filed: Jul. 29, 2022

(65) Prior Publication Data

US 2024/0036882 A1 Feb. 1, 2024

(51) Int. Cl.
*G06F 9/00* (2006.01)
*G06F 9/4401* (2018.01)

(52) U.S. Cl.
CPC .......... *G06F 9/4411* (2013.01); *G06F 9/4403* (2013.01); *G06F 9/4416* (2013.01); *G06F 9/4401* (2013.01)

(58) Field of Classification Search
CPC ..... G06F 9/4411; G06F 9/4403; G06F 9/4416
USPC .......................................................... 713/2
See application file for complete search history.

(56) References Cited

U.S. PATENT DOCUMENTS

| | | | |
|---|---|---|---|
| 7,668,093 B1 * | 2/2010 | Clubb ................ | H04L 12/1453 370/231 |
| 7,734,945 B1 * | 6/2010 | Levidow ............. | G06F 11/0793 714/3 |
| 9,141,373 B2 * | 9/2015 | Capper ............... | G06F 9/4401 |
| 9,697,226 B1 * | 7/2017 | Youngworth ........ | G06F 3/0655 |
| 10,606,702 B2 * | 3/2020 | Hayashi .............. | G06F 9/4401 |
| 10,789,059 B2 | 9/2020 | Capper | |
| 11,797,448 B2 * | 10/2023 | Peterson ............. | G06F 12/0897 |
| 2004/0064457 A1 * | 4/2004 | Zimmer ............... | G06F 21/575 |
| 2005/0229039 A1 | 10/2005 | Anderson et al. | |
| 2005/0229042 A1 * | 10/2005 | Crowell .............. | G06F 11/2284 714/36 |
| 2008/0256388 A1 * | 10/2008 | Anderson ............ | G06F 9/4401 714/24 |
| 2009/0042640 A1 * | 2/2009 | Gagner ................ | G07F 17/34 463/24 |
| 2009/0109786 A1 * | 4/2009 | Ye ....................... | G06F 12/0246 365/228 |
| 2010/0214464 A1 | 9/2010 | Amigo | |
| 2014/0365823 A1 * | 12/2014 | Michihata ........... | G06F 11/1469 714/16 |
| 2016/0366070 A1 * | 12/2016 | Yeung ................. | H04L 41/084 |
| 2018/0329719 A1 | 11/2018 | Siebenthaler | |

(Continued)

*Primary Examiner* — Volvick Derose
(74) *Attorney, Agent, or Firm* — Treyz Law Group; Jason Tsai (57) ABSTRACT

A method of operating a network device is provided. In response to an unplanned reboot, the network device can determine whether an unplanned reboot expedited recovery feature has been enabled on the network device. After determining that the unplanned reboot expedited recovery feature is enabled, the network device can identify a cause of the unplanned reboot. If the cause of the unplanned reboot is from a first set of events, a first bootup sequence can be performed. If the cause of the unplanned reboot is from a second set of events, a second bootup sequence that is expedited relative to the first bootup sequence can be performed.

20 Claims, 4 Drawing Sheets

(56) References Cited

U.S. PATENT DOCUMENTS

| | | | |
|---|---|---|---|
| 2020/0057669 A1* | 2/2020 | Hutcheson | G06F 3/0659 |
| 2020/0159302 A1* | 5/2020 | Chaiken | G06F 1/24 |
| 2022/0291850 A1* | 9/2022 | Reed | G06F 3/067 |
| 2023/0205886 A1* | 6/2023 | Koelewyn | G06F 21/54 |
| | | | 726/22 |
| 2023/0308342 A1* | 9/2023 | Rathinam | H04L 41/0654 |
| | | | 709/224 |

* cited by examiner

UNPLANNED REBOOT EXPEDITED RECOVERY FOR NETWORK DEVICES

BACKGROUND

A communication system includes multiple network devices that are interconnected to form a network for conveying data packets between different devices in the network. Modern data centers can include two tiers of switches such as spine switches and leaf switches. Each leaf switch can be connected to multiple server nodes and is used to aggregate traffic from the connected server nodes. Each spine switch can be connected to multiple leaf switches to interconnect the leaf switches in a full-mesh topology. The spine switches form a networking core and are coupled to a network control system.

A network device such as a leaf switch may unexpectedly reboot for various reasons. Despite best efforts in designing robust hardware and software for a network device, hardware flakiness and/or software bugs can result in such unplanned reboot. An unplanned reboot at a leaf switch will result in a network outage period for all of the servers connected to that leaf switch. If care is not taken, such network outage periods might last more than ten minutes. A 10+ minute network outage may be unacceptable for certain network deployments such as for a financial data center during trading hours.

DETAILED DESCRIPTION

A network device is provided that is operable to recover from an unplanned (unexpected) reboot. The network device may include a main processor such as a central processing unit (CPU), a packet processor configured to route packets in and out of the network device, a hardware controller configured to manage one or more peripheral hardware components on the network device, a power manager configured to control power sequencing events and to monitor power levels on the network device, and storage circuitry including non-volatile memory and volatile memory. At least a running configuration file and a running image version of the software that is currently running in the volatile memory are stored on the volatile memory. At least a network operating system, a boot configuration file, a startup configuration file, data plane information, and a readiness status can be stored on the non-volatile memory (sometimes referred to as persistent storage). The boot configuration file points to a boot configuration image. The readiness status reflects whether an unplanned reboot expedited recovery feature is enabled on the network device and is expected to succeed when an unplanned reboot occurs.

The network device may receive a command (from a user) to enable the unplanned reboot expedited recovery feature. The unplanned reboot expedited recovery feature may also be enabled by default. The startup configuration file can be updated to reflect the enablement of the unplanned reboot expedited recovery feature. After enabling the unplanned reboot expedited recovery feature, the CPU can communicate with the power manager via the hardware controller to change a reaction of the power manager to a reset of the CPU. For instance, the power manager can be reconfigured to allow the CPU to reset itself without power cycling the entire network device (typically, a CPU reset might result in power cycling the entire network device). An expedited recovery agent running on the CPU can perform a readiness check to obtain the readiness status (sometimes referred to as an unplanned reboot expedited recovery readiness status). The expedited recovery agent can perform the readiness check by confirming whether configuration settings on the network device are stable for a given duration, whether current system features are supported by the expedited recovery agent, and/or whether a version of the boot configuration image is identical to the running image version. The expedited recovery agent stores the readiness status and any hardware configuration data that can be used to help facilitate an expedited bootup sequence in the non-volatile memory.

In response to an unplanned reboot, the network device can check the readiness status stored in the non-volatile memory. After confirming the stored readiness status reflecting that the expedited recovery feature is enabled on the network and is expected to succeed, the network device can determine a reason or cause of the unplanned reboot. The CPU may, for example, communicate with the power manager to determine the cause of the unplanned reboot. In response to determining that the cause of the unplanned reboot is due to a power-related failure or glitch (such as an internal power rail failure, an internal power rail glitch, an external power supply failure, or an external power supply glitch), a cold bootup sequence can be performed. In response to determining that the cause of the unplanned reboot is due to a non-power-related failure or glitch (such as a CPU reset, an expiration of a watchdog timer, or a kernel panic event), an expedited bootup sequence faster than the cold bootup sequence can be performed. The expedited bootup sequence can help the network device recover from an unplanned reboot (reset) within seconds or within a minute, thus minimizing network down times.

Figure 1:
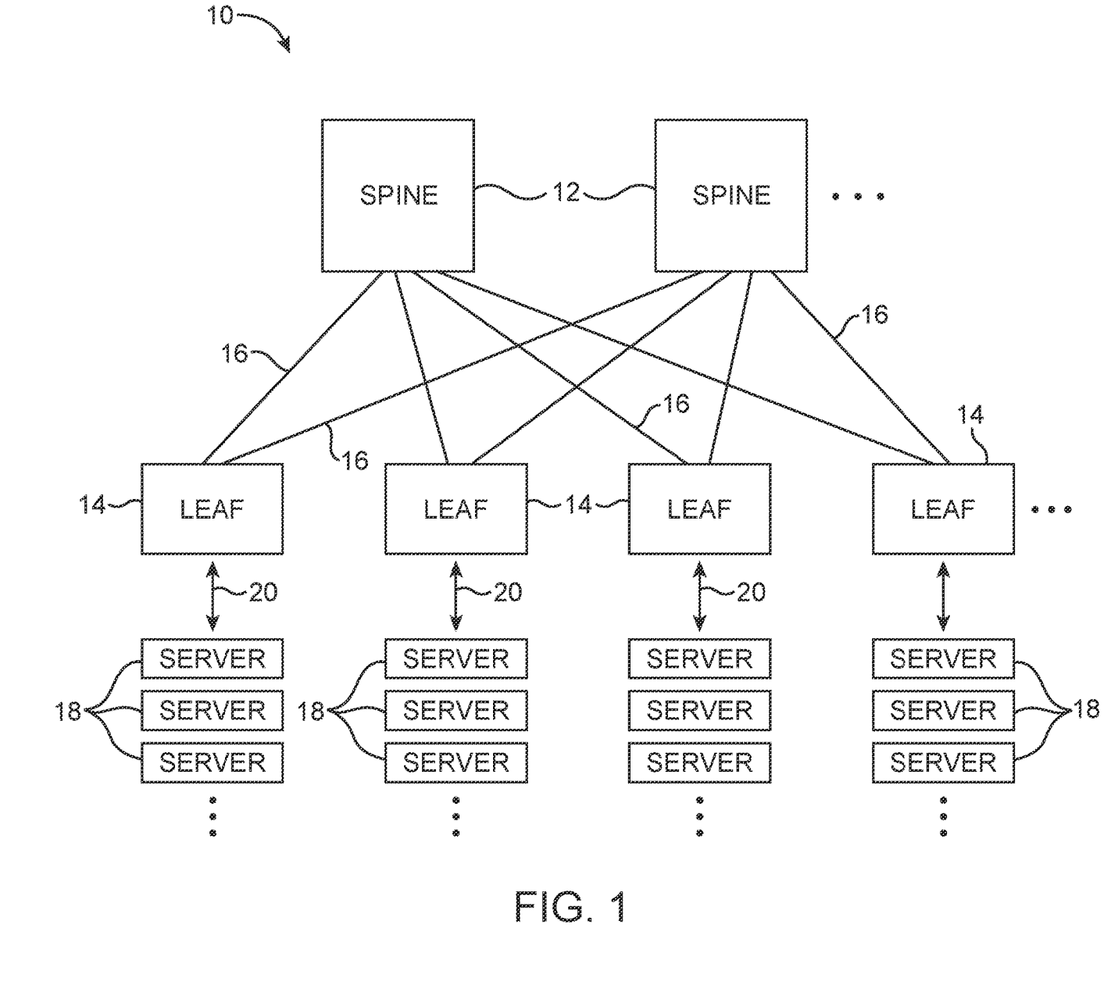
FIG. 1 is a diagram of an illustrative leaf-spine network topology in accordance with some embodiments.

FIG. 1 is a diagram of an illustrative networking system such as network system 10. Network system 10 may include multiple levels (tiers) of network switches such as spine switches 12 and leaf switches 14. The spine switches 12 can be considered to be part of a higher switching tier sometimes referred to as the spine layer. The leaf switches 14 can be considered to be part of a lower switching tier sometimes referred to as the leaf layer. The spine layer serves as the backbone of the overall network and is responsible for interconnecting all of the leaf switches 14 in a full mesh topology. Every leaf switch 14 is connected to every spine switch 12 via path(s) 16 in the network fabric (mesh).

Although only two spine switches 12 are shown in the example of FIG. 1, network system 10 may include any number of spine switches 12 (e.g., more than two spine switches, 2-10 spine switches, 10-100 spine switches, or hundreds or thousands of spine switches). The leaf layer may generally include more leaf switches 14 than the number of spine switches 12 in the spine layer. Although only four leaf switches 14 are shown in the example of FIG.

1, network system 10 may include any number of leaf switches 14 (e.g., more than four leaf switches, 4-10 leaf switches, 10-100 leaf switches, or hundreds or thousands of leaf switches). Network system having such spine and leaf layers is sometimes referred to as having a spine-and-leaf network topology.

Each leaf switch 14 can be connected to a respective group of servers (server nodes) 18 via local connection 20. In a data center system 10, each group of servers 18 can be mounted in a server rack, so each group of servers 18 connected to one leaf switch 14 is sometimes referred to collectively as a rack of server nodes. Leaf switch 14 is often mounted at the top of the server rack for ease of accessibility and cleaner cable management and is therefore sometimes referred to as a top-of-rack (ToR) switch. This is merely illustrative. If desired, the actual physical location of leaf switch 14 within each server rack can vary. As another example, leaf switch 14 may be mounted at the middle of or at some other intermediate position in a server rack. As another example, leaf switch 14 may be mounted at the bottom of a server rack. Leaf switch 14 may be connected to any number of servers 18. For example, leaf switch 14 may be connected (via local cabling 20) to up to ten servers in a rack, 10-20 servers in a rack, 10-50 servers in a rack, 50-100 servers in a rack, or more than 100 servers in a rack.

The spine-and-leaf network topology shown in FIG. 1 is illustrative and is not intended to limit the scope of the present embodiments. If desired, the techniques described herein to expedite recovery from an unplanned reboot can be applied to other types of network architecture.

Parts of a network system such as network system 10 of FIG. 1 can unexpectedly reboot due to various reasons or causes. Despite best efforts to design robust hardware and software for a network device, hardware flakiness and/or software bugs can result in unplanned reboots. Reasons for an unplanned reboot can include reset of an internal processor (e.g., when a main processing unit of a network device unexpectedly resets), a hardware-based timer reset that results in a system power cycle when the timer expires, an internal power rail failure or glitch, an external power supply failure or glitch, and/or incorrect device configurations, just to name a few. While a planned reboot or system upgrade can be prescheduled during downtimes, unplanned (unexpected) reboots can occur during inopportune times such as during peak usage hours (e.g., during trading hours of a financial data center system or other mission critical systems with limited redundancy). For example, an unplanned reboot of a single leaf switch 14 can cause the associated servers 18 in the same rack to be out of service for ten minutes or more.

Such lengthy down times (outage periods) is unacceptable and costly for many network deployments.

Figure 2:
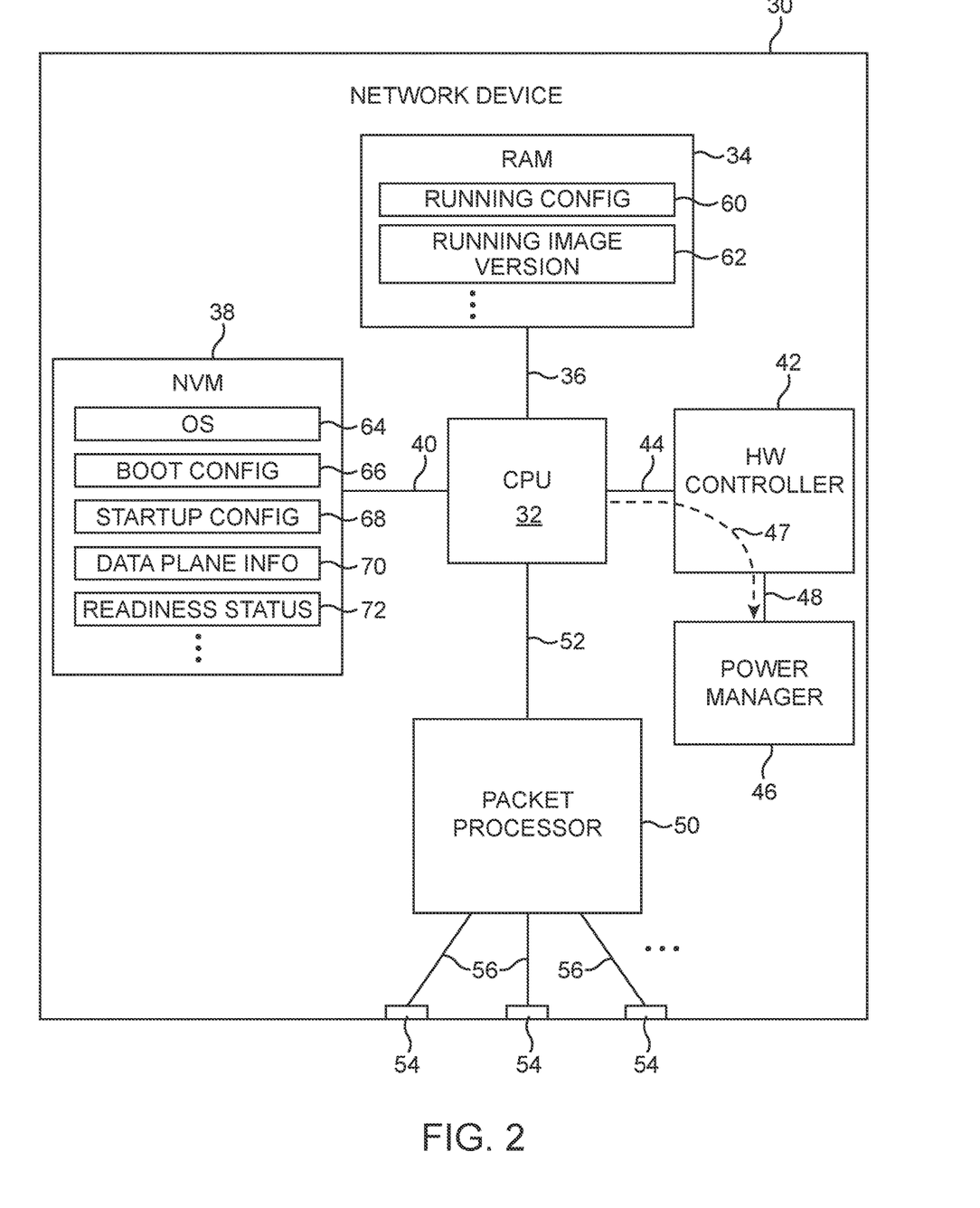
FIG. 2 is a diagram of an illustrative network device having various hardware components configured to support unplanned reboot expedited recovery in accordance with some embodiments.

In accordance with an embodiment, a network device can be configured and operated to perform an expedited bootup sequence that minimizes the network outage period resulting from an unplanned (unexpected) reset to less than one minute or even less than one second. FIG. 2 is a diagram of a networking device such as network device 30 that can be configured to provide expedited recovery from an unplanned reboot (reset). Network device 30 may be a switch, a router, a bridge, a hub, a repeater, a firewall, a device serving other networking functions, a device that includes a combination of these functions, or other types of network elements.

As an example, network device 30 can be part of a host device that is coupled to one or more output devices and/or to one or more input devices. The input device(s) may include one or more touchscreens, keyboards, mice, microphones, touchpads, electronic pens, joysticks, buttons, sensors, or any other type of input devices. The output device(s) may include one or more displays, printers, speakers, status indicators, external storage, or any other type of output devices. Network device 30 may be part of a digital system or a hybrid system that includes both digital and analog subsystems. Such system may be used in a wide variety of applications as part of a larger computing system, which may include but is not limited to: a datacenter, a computer networking system, a data networking system, a digital signal processing system, a graphics processing system, a video processing system, a computer vision processing system, a cellular base station, a virtual reality or augmented reality system, a network functions virtualization platform, an artificial neural network, an autonomous driving system, a combination of at least some of these systems, and/or other suitable types of computing systems.

Illustrative configurations in which network device 30 is a leaf switch (see, e.g., leaf switch 14 of FIG. 1) in a spine-and-leaf network topology may sometimes be described herein as an example. This is, however, merely illustrative. Network device 30 can represent any type of networking element that might need to recover quickly from an unplanned (unscheduled) reboot.

As shown in FIG. 2, network device 30 may include processing circuitry such as a central processing unit (CPU) 32, storage circuitry including volatile memory such as random-access memory (RAM) 34 and nonvolatile memory (NVM) 38, a packet processing circuit such as packet processor 50, a control circuit such as hardware controller 42, and a power management circuit such as power manager 46. In general, processing unit 32 may represent processing circuitry based on one or more microprocessors, graphics processing units (GPUs), host processors, general-purpose processors, microcontrollers, digital signal processors, application specific integrated circuits (ASICs), application specific system processors (ASSPs), programmable logic devices such as field-programmable gate arrays (FPGAs), a combination of these processors, or other types of processors. Central processing unit 32 may sometimes be referred to herein as a main processor 32.

The processing circuitry, which can include CPU 32, and the storage circuitry, which can include random-access memory 34 and non-volatile memory 38, are sometimes referred to collectively as control circuitry. The control (processing and storage) circuitry are therefore sometimes referred to as being part of a control plane of network device 30. Components in the control plane of network device 30 may exchange network topology information with other network devices and construct routing tables such as software forwarding tables using a routing protocol. Routing protocols are software mechanisms by which multiple network devices communicate and share information about the topology of the network and the capabilities of each network device. For example, network routing protocols may include Border Gateway Protocol (BGP) or other distance vector routing protocols, Enhanced Interior Gateway Routing Protocol (EIGRP), Exterior Gateway Protocol (EGP), Routing Information Protocol (RIP), Open Shortest Path First (OSPF) protocol, Label Distribution Protocol (LDP), Multiprotocol Label Switching (MPLS), Immediate system-to-immediate system (IS-IS) protocol, Link Aggregation Control Protocol (LACP), Multi-Chassis Link Aggregation (MLAG) protocol, or other Internet routing protocols (just to name a few).

The storage circuitry may include non-transitory (tangible) computer readable storage media that stores an operating system and/or any software code, sometimes referred to as program instructions, software, data, instructions, or code. Non-volatile memory 38 is a type of computer memory that can retain stored information even after power is removed and is therefore sometimes referred to as "persistent" storage. Examples of non-volatile memory 38 include flash memory, solid-state drive (SSD), read-only memory (ROM), electrically programmable ROM, disk storage, hard disk drive, optical disc, etc. In contrast, volatile memory 34 is a type of computer memory that needs power to retain stored information (e.g., the stored data is lost once power is removed). Examples of volatile memory 34 include dynamic random-access memory (DRAM) and static random-access memory (SRAM). Volatile memory 34 is often referred to as "primary storage" (also referred to as main storage or system storage), whereas nonvolatile memory 38 is sometimes referred to as "mass storage."

Main processor 32 may be coupled to the volatile memory (RAM) 34 via path 36. Path 36 may (for example be a double data rate (DDR) interface such as a DDR type-3 (DDR3) or DDR type-4 (DDR4) interface. RAM 34 may be implemented as a single in-line memory module (SIMM) component or a dual in-line memory module (DIMM) component (as examples). Data that can be stored on RAM 34 may include a running configuration such as running configuration file 60, a running image version such as running image version 62, and/or other information that need not be retained when power is lost. The running configuration file 60 (sometimes referred to as the "running-config") is a file that contains the current network device/system operating settings that are stored in a database on RAM 34. All changes to network device 30 by a user would apply to the running configuration file 60. The running image version 62 includes one or more files (stored as fields in RAM 34) that make up the version of the software or operating system currently running on device 30.

Main processor 32 may be coupled to non-volatile memory 38 via path 40. Path 40 may (for example) be a Serial AT Attachment (SATA) bus interface, an Ethernet bus interface, a Universal Serial Bus (USB) bus interface, or other mass storage computer bus interface(s). Processor 32 may be used to run a network device operating system such as operating system (OS) 64 and/or other software/firmware that is stored on nonvolatile memory 38. Operating system 64 may be a network operating system configured to manage computer network resources for data centers, cloud networks, and other network systems. Operating system 64 may be scalable to support, manage, and/or provision hundreds or thousands of compute and storage nodes in the overall network. Operating system 64 may be a Linux based operating system, a UNIX based operating system, a Microsoft Windows based operating system, a Mac based operating system, or other types of network operating systems. Operating system 64 may be programmable and modular. Operating system 64 can provide live patching and upgrade of individual processes during normal network operation, self-healing resiliency for minimum network downtime, custom monitoring capabilities to provide visibility into application performance, troubleshooting capabilities to identify network performance problems, and other network functions.

Non-volatile (persistent) storage 38 may also be used to store other information such as configuration files (e.g., a boot configuration file 66 and a startup configuration file 68), data plane information 70, a readiness status 72, and other information that needs to be retained even after power is removed. The boot configuration file 66 (sometimes referred to as "boot-config") is a settings file that contains the location (pointer) and the name of the image to be loaded when the system is booting up (e.g., boot-config identifies which version of the operating system to load when powering on). In other words, boot configuration file 66 can be used to locate the flash software image next time the system boots up. The software image that the boot-config points to can be referred to and defined as the "boot configuration image." The version of the boot configuration image may or may not be the same as running image version 62.

On the other hand, the startup configuration file 68 (sometimes referred to as the "startup-config") is a settings file that includes a list of system settings that control how the operating system behaves. Upon a reboot, network device 30 may replace running configuration file 60 on RAM 34 with startup configuration file 68. As described above, changes made by a user after reboot will only be reflected in running configuration file 60. The startup configuration file 68 may thus be different from the running configuration file 60 if the user modifies one or more network configuration settings since the last reboot. Changes to running configuration file 60 that are not copied to startup configuration file 68 will be lost when device 30 reboots.

Information 70 may include information relating to a data plane of network device 30. Packet processor 50 is oftentimes referred to as being part of the data plane or forwarding plane. Processor 32 may be coupled to packet processor 50 via path 52. Path 52 may be a Peripheral Component Interconnect Express (PCIe) interface (as an example) or other processor-to-processor computer bus interface. Packet processor 50 can be implemented as a field-programmable gate array (FPGA) to provide improved programmability/flexibility or can be implemented as other types of processors and is sometimes referred to as a packet processing chip or a network processing unit (NPU). Packet processor 50 is coupled to input-output ports 54 via paths 56 and receives and outputs data packets via ports 54. Ports 54 are sometimes referred to as ingress-egress ports. Packet processor 50 can analyze the received data packets, process the data packets in accordance with a network protocol, and forward (or drop) the data packets accordingly. Data packets received in the data plane may optionally be analyzed in the control plane to handle more complex signaling protocols. Data plane information 70 stored on persistent memory 38 may include information about the speed(s) of input-output ports 54, information about any statically and/or dynamically programmed routes, any critical table(s) such as forwarding tables or forwarding information base (FIB), critical performance settings for packet processor 50, other forwarding data, and/other information that is needed for proper function of packet processor 50.

Readiness status information such as a readiness status 72 may also be stored on persistent memory 38. Readiness status 72, sometimes referred to as readiness information or readiness indication data, may reflect whether network device 30 is armed for expedited recovery (e.g., whether the expedited recovery feature is enabled on device 30) and whether the expedited recovery is likely to succeed based on certain criteria. For example, the expedited recovery agent may compute a probability that the expedited recovery is likely to succeed based on the current configurations of device 30 and compare the computed probability to a threshold. If the probability is greater than or equal to the threshold, then the expedited recovery is likely to succeed. If the probability is less than the threshold, then the expedited recovery is unlikely to succeed. This is merely illustrative. The criteria for measuring success can be based on one or more predetermined, user-defined, or other objective criterion. Other ways of determining the likelihood of success of the expedited recovery sequence can be employed. An unplanned reboot expedited recovery feature on network device 30 has to be enabled by the user of network device 30. When a user enables the unplanned reboot expedited recovery feature (e.g., by inputting a command to enable such feature), the startup configuration file 68 may be updated to reflect this change in setting. The unplanned reboot expedited recovery feature may also be optionally turned on (enabled) by default. Device configurations in which the unplanned reboot expedited recovery feature is turned off (disabled) by default is sometimes described herein as an example.

When the expedited recovery feature is enabled (either by the user or by default), network device 30 can be said to be "armed" for expedited recovery whenever an unplanned reboot occurs. Readiness status 72 may have a first value indicating that device 30 is "ready" when the expedited recovery feature is enabled (armed) and is expected to succeed. Readiness status 72 may have a second value, different than the first value, indicating that device 30 is "unready" when the expedited recovery feature is not expected to succeed even when the expedited recovery feature is armed on device 30. Thus, when the readiness status 72 indicates that network device 30 is ready to perform expedited recovery, network device 30 should be able to recover quickly from an unplanned (unexpected) reboot by minimizing network outages to less than one minute or less than one second.

Main processor 32 may also be coupled to hardware controller 42 via path 44. Path 44 may, for example, be an Inter-Integrated-Circuit (I²C) communication bus, Universal Asynchronous Reception and Transmission (UART) communication bus, Serial Peripheral Interface (SPI) communication bus, or other types of controller based interfaces. Hardware controller 42 can be a programmable logic device that is configured to control one or more hardware pins associated with device 30 in order to control one or more peripheral hardware components on device 30 such as to manage the operation of fans, sensors (e.g., temperature sensors), audio components, batteries, power supplies, etc.

Hardware controller 42 may be coupled to power manager 46 via path 48. Similar to path 44, path 48 may be an Inter-Integrated-Circuit (I²C) communication bus, Universal Asynchronous Reception and Transmission (UART) communication bus, Serial Peripheral Interface (SPI) communication bus, or other types of controller based interfaces. Power manager 46 (sometimes referred to as a power management device) may be configured to control power sequencing operations on device 30, to monitor individual power rails (power supply lines) on device 30, to record one or more reasons/causes for reboot of device 30 (e.g., by monitoring one or more error pins on device 30), and/or to detect other events associated with one or more power supplies on network device 30. The number of hardware components shown in FIG. 2 is merely illustrative and is not intended to limit the scope of the present embodiments. If desired, network device 30 may include more components than the ones shown in FIG. 2 or may include fewer components than the ones shown in FIG. 2. The hardware components of FIG. 2 (e.g., components 32, 34, 38, 42, 46, and 50) may be mounted on a printed circuit board sometimes referred to as a mother board or other electrical component mounting substrate.

Figure 3:
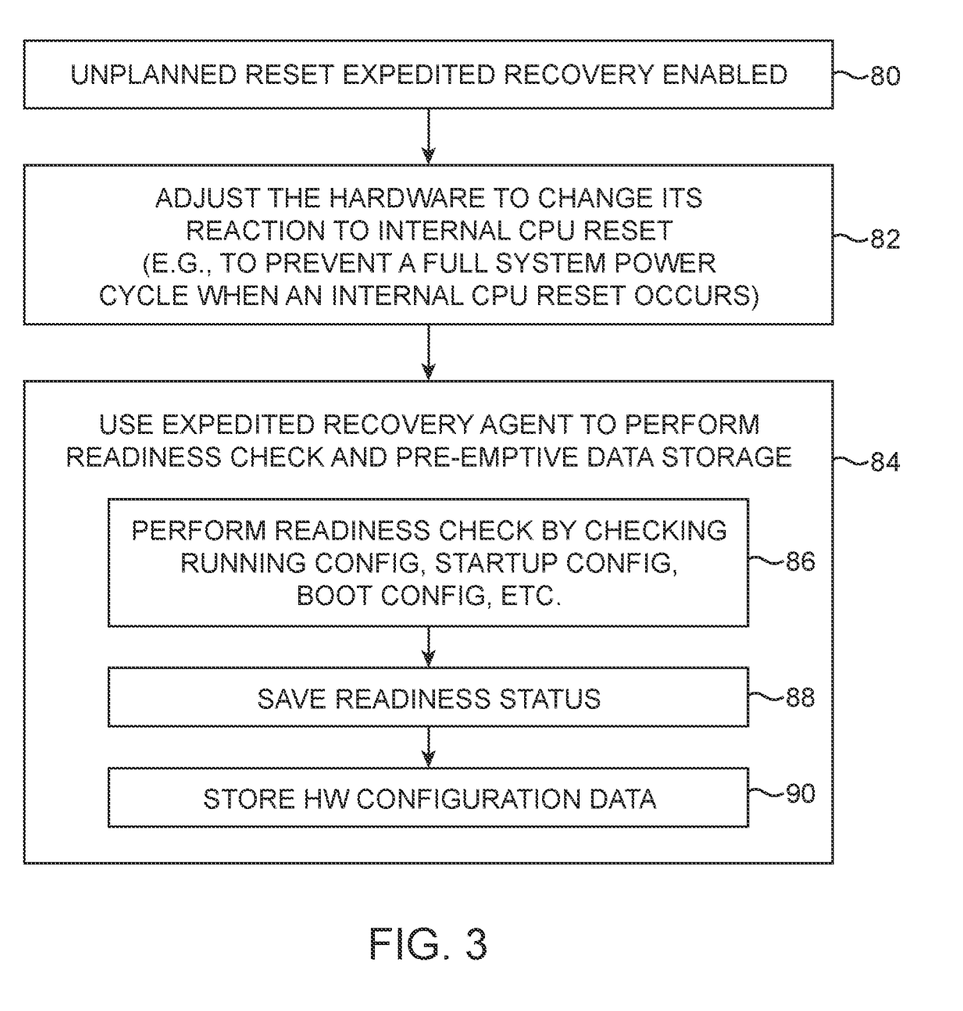
FIG. 3 is a flow chart of illustrative steps for configuring a network device to be armed and ready to recover from an unplanned reboot event in accordance with some embodiments.

As described above, network device 30 should have its unplanned reboot expedited recovery feature enabled (armed) so that it can subsequently recover quickly from an unplanned reset. FIG. 3 is a flow chart of illustrative steps for configuring network device 30 to be armed and ready to recover from an unplanned reboot (reset) event. During the operations of block 80, the unplanned reboot expedited recovery feature may be enabled either by default or by a user of device 30. The user may, for example, update the startup configuration file (e.g., startup-config 68 in FIG. 2) or otherwise apply a configuration command to enable the unplanned reboot expedited recovery feature. When the unplanned reboot expedited recovery feature is armed, an expedited recovery agent (application) may be activated to run on processor 32.

During setup operations of block 82, network device 30 may adjust some of its hardware components to change their reaction to an internal CPU reset (e.g., to prevent a full system power cycle when an internal CPU reset occurs). For example, during this setup step, processor 32 may configure the hardware controller 42 and/or the power manager 46 to change their response behavior when certain errors are triggered by processor 32. Processor 32 may assert certain error signals indicating an unplanned CPU reset event. Normally, upon detecting assertion of such error signals, power manager 46 may direct network device 30 to perform a full system power cycle. After the changes of block 82, however, network device 30 will no longer perform a full system power cycle but will permit only processor 32 (and no other components within device 30) to reset itself. To effectuate this change, processor 32 may reconfigure the behavior of hardware controller 42 and/or power manager 46 by transmitting control signals to these components via paths 44 and/or 48 (as shown by dotted signal flow 47).

During the operations of block 84, the expedited recovery agent running on processor 32 can perform a readiness check and preemptively store data that is needed for a successful recovery. The expedited recovery agent (sometimes referred to as an expedited recovery state machine) may examine various system states periodically (e.g., may perform a readiness check every minute, every five minutes, every ten minutes, every 10 seconds, every 10-60 seconds, every 1-10 minutes, or at other suitable intervals) and/or may examine various system states in response to a change in the system configuration (e.g., in response to a change in the running configuration file or the startup configuration file). The operations of block 84 may optionally include one or more operations of sub-blocks 86, 88, and 90.

During the operations of sub-block 86, the expedited recovery agent may perform one or more readiness checks. As an example, the expedited recovery agent may check whether the system configuration has been stable for a period of time (e.g., whether the system configuration has been stable for at least 5 minutes, at least 10 minutes, at least 1 minute, 5-10 minutes, or more than 10 minutes).

As another example, the expedited recovery agent may check whether the system configurations (e.g., the startup configuration file) and/or other networking features are supported by the expedited recovery agent. For example, the expedited recovery agent may need to confirm that an OpenFlow feature in the startup configuration file is not enabled. If the OpenFlow feature is enabled, then the expedited recovery agent may not be able to guarantee a sub-one-minute outage. Other possible configuration(s) to check during sub-block 86 may including confirming that a DirectFlow feature is not enabled, that a Virtual Router Redundancy Protocol (VRRP) is not enabled, that resilient equal-cost multipath (ECMP) routing is not enabled, just to name a few.

As another example, the expedited recovery agent may check whether the version of the boot configuration image is the same as the running image version. This check ensures that there are no new features enabled that could potentially cause the expedited recovery to fail. If desired, the expedited recovery agent may also check the data plane information (e.g., data plane information 70 in FIG. 2) to ensure that the data plane configuration is compatible with the expedited recovery agent.

During the operations of sub-block 88, the expedited recovery agent may save the resulting readiness status to the persistent storage (see, e.g., readiness status 72 stored on non-volatile memory 38 in FIG. 2). The readiness status may have a binary value (e.g., status 72 may indicate that device 30 is either "ready" or "unready"). The readiness status may only indicate a "ready" state if the unplanned reset expedited recovery feature has been enabled (armed) at step and if all of the checks performed during sub-block 86 are satisfactory (e.g., if the running configuration file has been stable for a predetermined period of time, if all the features in the startup configuration file are supported by the expedited recovery agent, and if the boot configuration image is identical to the running configuration image). If any of the checks performed during sub-block 86 fails or is unsatisfactory, then the readiness status will reflect an "unready" state. The readiness status can be read from the persistent storage during a subsequent system reboot to determine whether the network device can proceed with an expedited recovery bootup sequence. If the readiness status indicates a ready state, then the network device can proceed to reboot using the expedited recovery bootup sequence. If the readiness status indicates an unready state, then the network device can proceed to reboot using a cold bootup sequence that is slower than the expedited recovery bootup sequence.

During the operations of sub-block 90, any hardware configuration data that is important or critical to help the system recover from an unplanned reboot (e.g., configuration data that might not be available in the boot configuration file or the startup configuration file) can be optionally saved to the persistent storage. The hardware configuration data stored in sub-block can therefore be used during an expedited bootup sequence to help speed up the recovery. The operations of sub-blocks 86, 88, and 90 can be performed periodically (e.g., every minute, every five minutes, every ten minutes, every 10 seconds, every 10-60 seconds, every 1-10 minutes, or at other suitable intervals) or in response to system configuration changes and are therefore sometimes referred to as "preemptive" readiness check and data storage operations. At this point, network device 30 is armed and ready to recover from an unplanned reboot.

Figure 4:
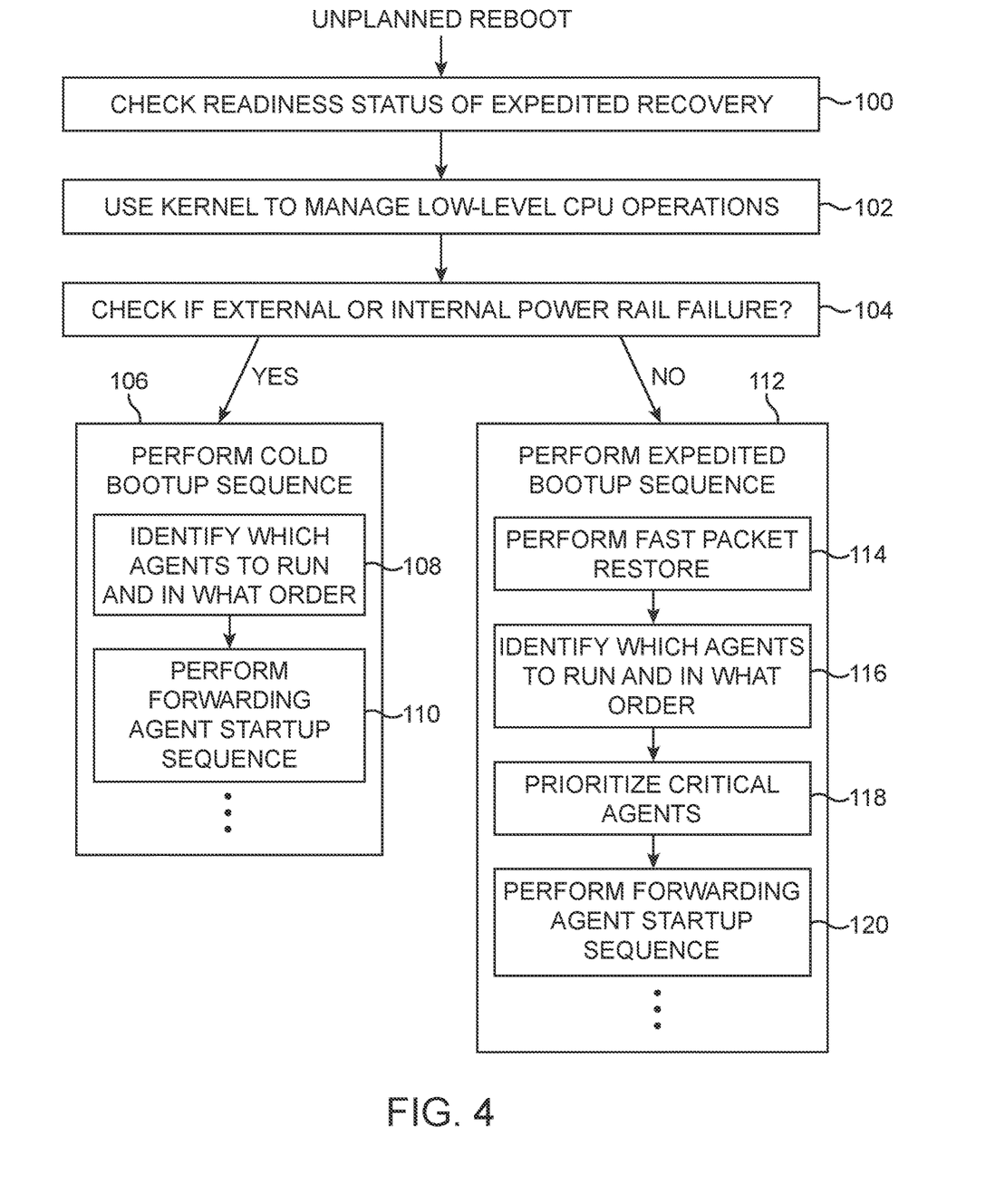
FIG. 4 is a flow chart of illustrative steps for restarting a network device in response to an unplanned reboot event in accordance with some embodiments.

FIG. 4 is a flow chart of illustrative steps for restarting a network device 30 in response to an unplanned reboot event. In response to an unplanned reboot event, a network operating system on device 30 may retrieve the readiness status from the persistent storage (see operations of block 100). The expedited bootup sequence is only permitted if the readiness status indicates that the expedited recovery feature on network device 30 has been armed and is "ready" for expedited recovery.

During the operations of block 102, a kernel in the network operating system may be used to manage low-level operations on processor 32. During this step, a root file system that contains software and programs that configure device 30 to perform switching functions may also be activated.

During the operations of block 104, network device 30 may check if the unplanned reboot was due to an external power or an internal power rail failure (e.g., network device 30 may determine a cause of the unplanned reboot). For example, processor 32 may communicate with power manager 46 to determine a reason (cause) for the unplanned reboot. Expedited recovery may be performed only for non-power-rail failures such as for an internal CPU reset (e.g., when processor 32 resets internally without a power glitch), a watchdog reset (e.g., a hardware based timer triggers an automatic system restart when the system encounters a system error), or a kernel panic event (e.g., when the network operating system's kernel detects an internal fatal error).

In response to a power outage (e.g., if an external/input power supply fails or glitches or if an internal power supply fails or glitches), network device 30 may have to undergo a full system power cycle by performing a cold bootup sequence (see operations of block 106). The cold bootup sequence may include operations shown in one or more sub-blocks 108 and 110. During the operations of sub-block 108, the network operating system may identify which agents should run and in what order. During the operations of sub-block 110, the network operating system may perform a forwarding agent startup sequence. The forwarding agent(s) may represent one or more processes that are required to manage a network processing unit (see, e.g., packet processor 50 in FIG. 2). During the cold boot sequence, the forwarding agent startup sequence may simply involve a chip reset of the packet processor. By resetting the packet processor, the software can easily ensure that any forwarding or routing tables be initialized to a known state. Cold bootup sequence 106 can optionally include other initialization or boot-related operations (not shown) before or after each of sub-blocks 108 and 110.

In response to a non-power-rail-related failure (e.g., in response to an CPU internal reset, a watchdog reset, a kernel panic event, or other non-power system errors), network device 30 may perform an expedited bootup sequence that reduces network outages to less than one second or less than one minute (see operations of block 112). The expedited bootup sequence of block 112 may include operations shown in one or more sub-blocks 114, 116, 118, and 120. The expedited bootup sequence may be handled by the expedited recovery agent running on the CPU. Expedited bootup sequence 112 may be faster than cold bootup sequence 106. Expedited bootup sequence 112 may be completed within one second, within one minute, within one to five minutes, within 1-60 seconds, or less than ten minutes. In contrast, the cold bootup sequence 106 might last more than a minute, more than five minutes, 1-10 minutes, 5-10 minutes, more than 10 minutes, or more than 20 minutes. In general, cold bootup sequence 106 may have a first bootup duration, whereas expedited bootup sequence 112 may have a second bootup duration. The second bootup duration may be less than half the first bootup duration, less than a quarter of the first bootup duration, less than 20% of the first bootup duration, less than 10% of the first bootup duration, less than 5% of the first bootup duration, or less than 1% of the first bootup duration.

During the operations of sub-block 114, network device 30 may perform a fast packet restore operation. The fast packet restore operation may involve identifying data packets that are needed for the system to let neighboring network devices know that the network device is still active. The network device may, for example, send "hello" packets or "keep-alive" packets to neighboring switches.

During the operations of sub-block 116, the network operating system may identify which agents should run and in what order. During the operations of sub-block 118, an orchestrator in the network operating system may prioritize the more critical agents. For example, agents such as agents for programming the data plane may be activated before (faster than) other less critical agents such as agents for monitoring temperature or agents for managing command line interface processes. Prioritizing the agents may involve identifying and partitioning the startup agents into a first group of agents (e.g., critical agents that are needed for a proper reboot) and a second group of agents (e.g., non-critical agents that are not needed for a proper reboot).

During the operations of sub-block 120, the network operating system may perform a forwarding agent startup sequence. The forwarding agent(s) may represent one or more processes that are required to manage a network processing unit (see, e.g., packet processor 50 in FIG. 2). During this step, the data plane information 70 stored in the persistent storage such as the state of the forwarding tables and/or other critical tables are restored and re-applied to the tables in the packet processor. The startup configuration file can also be retrieved from the persistent storage and loaded onto the RAM storage as the running configuration file. Unlike the forwarding agent startup sequence in sub-block 110 of the cold bootup sequence, the forwarding agent startup sequence in sub-block 120 of the expedited bootup sequence can be performed without a chip reset of the packet processor if the tables on the packet processor are carefully managed.

Expedited bootup sequence 112 can optionally include other initialization or boot-related operations (not shown) before or after each of sub-blocks 114, 116, 118, and 120. Performing expedited bootup sequence 112 in this way can help network device 30 recover from an unplanned reboot by limiting network outages to less than one minute or less than one second.

The operations of FIGS. 3 and 4 are merely illustrative. At least some of the described operations may be modified or omitted; some of the described operations may be performed in parallel; additional processes may be added or inserted between the described operations; the order of certain operations may be reversed or altered; the timing of the described operations may be adjusted so that they occur at slightly different times, or the described operations may be distributed in a larger system.

The methods and operations described above in connection with FIGS. 1-4 may be performed by the components of a network device using software, firmware, and/or hardware (e.g., dedicated circuitry or hardware). Software code for performing these operations may be stored on non-transitory computer readable storage media (e.g., tangible computer readable storage media) stored on one or more of the components of the network device. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of the network device (e.g., processor 32 of FIG. 2).

The foregoing is merely illustrative and various modifications can be made to the described embodiments. The foregoing embodiments may be implemented individually or in any combination.

What is claimed is:

1. A method of operating a network device comprising:
in response to an unplanned reboot, determining whether an unplanned reboot expedited recovery feature is enabled on the network device;
after determining that the unplanned reboot expedited recovery feature is enabled, determining a cause of the unplanned reboot;
in response to determining that the cause of the unplanned reboot is from a first set of events, performing a first bootup sequence; and
in response to determining that the cause of the unplanned reboot is from a second set of events different than the first set of events, performing a second bootup sequence that is faster than the first bootup sequence.

2. The method of claim 1, wherein the network device includes a main processor and a power management circuit, the method further comprising:
changing a reaction of the power management circuit to a reset of the main processor.

3. The method of claim 2, wherein changing the reaction of the power management circuit comprises allowing the main processor to reset without power cycling the network device in response to a reset of the main processor.

4. The method of claim 1, further comprising:
storing a startup configuration file on non-volatile memory in the network device;
receiving a command to enable the unplanned reboot expedited recovery feature; and
updating the startup configuration file in response to receiving the command to enable the unplanned reboot expedited recovery feature.

5. The method of claim 1, wherein determining whether the unplanned reboot expedited recovery feature is enabled on the network device comprises checking readiness status information that is stored on non-volatile memory in the network device.

6. The method of claim 5, further comprising:
performing a readiness check to obtain the readiness status information, wherein performing the readiness check includes checking whether configuration settings on the network device are stable for a given duration.

7. The method of claim 5, further comprising:
performing a readiness check to obtain the readiness status information, wherein performing the readiness check includes checking whether current system features are supported by an expedited recovery agent that handles the expedited bootup sequence.

8. The method of claim 5, further comprising:
storing a boot configuration file on the non-volatile memory, the boot configuration file identifying a boot configuration image;
storing a running image version on non-volatile memory in the network device; and
performing a readiness check to obtain the readiness status information, wherein performing the readiness check includes checking whether a version of the boot configuration image is identical to the running image version.

9. The method of claim 5, further comprising:
storing, in the non-volatile memory, hardware configuration data that is used by the network device to recover from the unplanned reboot.

10. The method of claim 5, further comprising:
periodically performing a readiness check to update the readiness status information and storing the updated readiness status information on the non-volatile memory.

11. The method of claim 5, further comprising:
in response to detecting a settings change in the network device, performing a readiness check to update the readiness status information and storing the updated readiness status information on the non-volatile memory.

12. The method of claim 1, wherein the first set of events comprises power failures selected from the group consisting of: an internal power rail failure, an internal power rail glitch, an external power supply failure, and an external power supply glitch.

13. The method of claim 1, wherein performing the first bootup sequence comprises:
identifying which agents to run during the first bootup sequence and determining what order the agents should run; and
resetting a packet processor on the network device.

14. The method of claim 1, wherein the network device comprises a main processor and a watchdog timer, and wherein the second set of events comprises non-power failures selected from the group consisting of: a reset of the main processor, an expiration of the watchdog timer, and a kernel panic event.

15. The method of claim 1, wherein performing the second bootup sequence comprises:
notifying neighboring network devices that the network device is still active;
identifying which agents to run during the second bootup sequence, wherein the agents is partitioned into first and second groups of agents;
prioritizing the first group of agents over the second group of agents; and
restoring information in a packet processor without resetting the packet processor.

16. A method of operating a network device comprising:
subsequent to an unplanned reboot, determining a cause of the unplanned reboot;
in response to determining that the cause of the unplanned reboot is a power-related failure, performing a first bootup sequence; and
in response to determining that the cause of the unplanned reboot is a non-power-related failure, performing a second bootup sequence that is faster than the first bootup sequence.

17. The method of claim 16, wherein performing the first bootup sequence comprises rebooting the network device in over a minute and wherein performing the second bootup sequence comprises rebooting the network device in less than a minute.

18. The method of claim 16, further comprising:
enabling an expedited recovery feature on the network device; and
performing the second bootup sequence when the expedited recovery feature is enabled on the network device.

19. The method of claim 16, further comprising:
performing a readiness check to determine whether the network device is able to recover from an unplanned reboot and storing a corresponding readiness status on non-volatile memory in the network device; and
checking the readiness status in response to the unplanned reboot, wherein determining the cause of the unplanned reboot comprises determining the cause of the unplanned reboot in response to the readiness status reflecting that the network device is able to recover from the unplanned reboot.

20. A method of operating a network device having a central processing unit and a power management circuit, the method comprising:
in response to determining that an unplanned reboot expedited recovery feature is enabled, changing a reaction of the power management circuit to a reset of the central processing unit;
using an expedited recovery agent running on the central processing unit to determine a readiness status by checking whether the unplanned reboot recovery feature is enabled and is likely to succeed based on at least one criterion;
storing the readiness status and hardware configuration data to persistent storage on the network device;
in response to an unplanned reboot, checking the readiness status;
in response to verifying the readiness status reflecting that the unplanned reboot recovery feature is enabled and is likely to succeed based on the at least one criterion, determining a reason for the unplanned reboot;
in response to determining that the reason for the unplanned reboot is a power failure, performing a first boot sequence; and
in response to determining that the reason for the unplanned reboot is a non-power failure, performing a second boot sequence using the stored hardware configuration data, the second boot sequence being faster than the first boot sequence.

* * * * *